June 2, 1964    H. KRESS    3,135,094
DRIVE FOR CONVERSION OF A RECIPROCATING MOVEMENT INTO
A ROTARY MOVEMENT WITH A LIQUID AS CONVERSION MEANS
Filed Aug. 17, 1962    3 Sheets-Sheet 1

June 2, 1964 H. KRESS 3,135,094
DRIVE FOR CONVERSION OF A RECIPROCATING MOVEMENT INTO
A ROTARY MOVEMENT WITH A LIQUID AS CONVERSION MEANS
Filed Aug. 17, 1962 3 Sheets-Sheet 2

Inventor:
Hewig Kress

United States Patent Office 3,135,094
Patented June 2, 1964

3,135,094
DRIVE FOR CONVERSION OF A RECIPROCATING MOVEMENT INTO A ROTARY MOVEMENT WITH A LIQUID AS CONVERSION MEANS
Herwig Kress, Essen-Bredeney, Germany, assignor to Beteiligungs- und Patentverwaltungsgesellschaft mit Beschrankter Haftung, Essen, Germany, a corporation of Germany
Filed Aug. 17, 1962, Ser. No. 217,634
Claims priority, application Germany Aug. 23, 1961
4 Claims. (Cl. 60—54.5)

The present invention relates to drives for conversion of a reciprocating movement into a rotary movement with a liquid as conversion means, particularly to drives between pistons and a motor shaft for internal combustion engines with reciprocating pistons, with an eccentric, circular disc and with slides movably mounted in the engine housing, which abut the peripheral face of the eccentric circular disc over intermediate members, whereby the guiding faces of the intermediate members have the same curvature as the periphery of the eccentric, circular disc.

Drives are known wherein the reciprocating movement of a piston is converted into the rotary movement of a shaft by the operative connection of the piston with an eccentric, circular disc by means of a conduit filled with a pressure fluid and, thereby, a predetermined position of the eccentric, circular disc is coordinated to each position of the piston and vice versa. In these drives, the conventional mechanical crank drive is thus replaced by a pressure fluid column subjected to a reciprocating pendulum movement and disposed between the eccentric, circular disc and the working piston. The sealing of the individual working chambers is brought about there by means of slides, which move along the peripheral face of the circular disc and which are radially displaceable in corresponding slots provided in the engine housing against pressure, for example of springs. The slides are in line contact with the peripheral face of the circular disc. They are, therefore, subjected to wear, particularly at higher rotary speeds and pressures, which wear can assume an appreciable measure. Also, the sealing effect leaves much to be desired by the application of such slides due to the line contact between the slides and the peripheral face of the circular disc.

In recognition that these drawbacks are removed, if sealing elements are applied, which engage the rotary circular disc not in a line contact, but in face contact, it has been already proposed to provide intermediate members between the slides and the circular disc, which intermediate members are linked to the slides and which slide with a sealing face on the periphery of the circular disc, which intermediate members have the same curvature as the latter.

It is one object of the present invention to provide a drive for conversion of a reciprocating movement into a rotary movement with a liquid as conversion means, which improves further the known devices, particularly to make them simpler constructively and technically, and first of all to make them safer for operation.

It is another object of the present invention to provide a drive for conversion of a reciprocating movement into a rotary movement with a liquid as conversion means which resides, in the first place, in an arrangement according to which a circular disc, mounted eccentrically on an engine shaft, rotates in a ring, which has lateral, oppositely disposed sealing faces, which cooperate, during the rotation of the circular disc, with corresponding sealing faces of slides which are disposed opposite each other and slidably in the engine housing. These slides move in turn during the rotation of the circular disc on guiding faces in the engine housing, which guiding faces are disposed preferably perpendicularly to the sealing face of the ring surrounding the circular disc.

It is still another object of the present invention to provide a drive for conversion of a reciprocatinng movement into a rotary movement with a liquid as conversion means, wherein the sealing faces of the ring surrounding the circular disc, as well as the sealing faces of the slides and the sealing faces in the engine housing may be covered in known manner with a layer of a material having good gliding characteristics. Sealing strips of such gliding material can be inserted in these sealing faces. These sealing strips can abut, for example against the pressure of springs, on the corresponding sealing faces of the other part. Upon use of cylindrical sealing faces between the slide members and the engine housing, pins of the slides, which slide in corresponding bores of the engine housing, can be equipped, in known manner, with piston rings, which can be eliminated, however, if a sufficiently small fitting between the pins and the bores is present.

It is yet another object of the present invention to provide a drive for conversion of a reciprocating movement into a rotary movement with a liquid as conversion means, wherein the ring surrounding the circular disc can be formed as one part, as well as of several parts. It can have perforations or the like on the greater part of its periphery and can engage only with two oppositely disposed parts on its inner periphery, the inner periphery of the circular disc and the lateral end faces of the housing, respectively.

The ring surrounding the circular disc can be connected with the sealing members sliding in the engine housing by interlocking, as well as by pressure.

With these and other objects in view which will become apparent in the following detailed description, the present invention will be clearly understood in connection with the accompanying drawings, in which.

Figure 1:
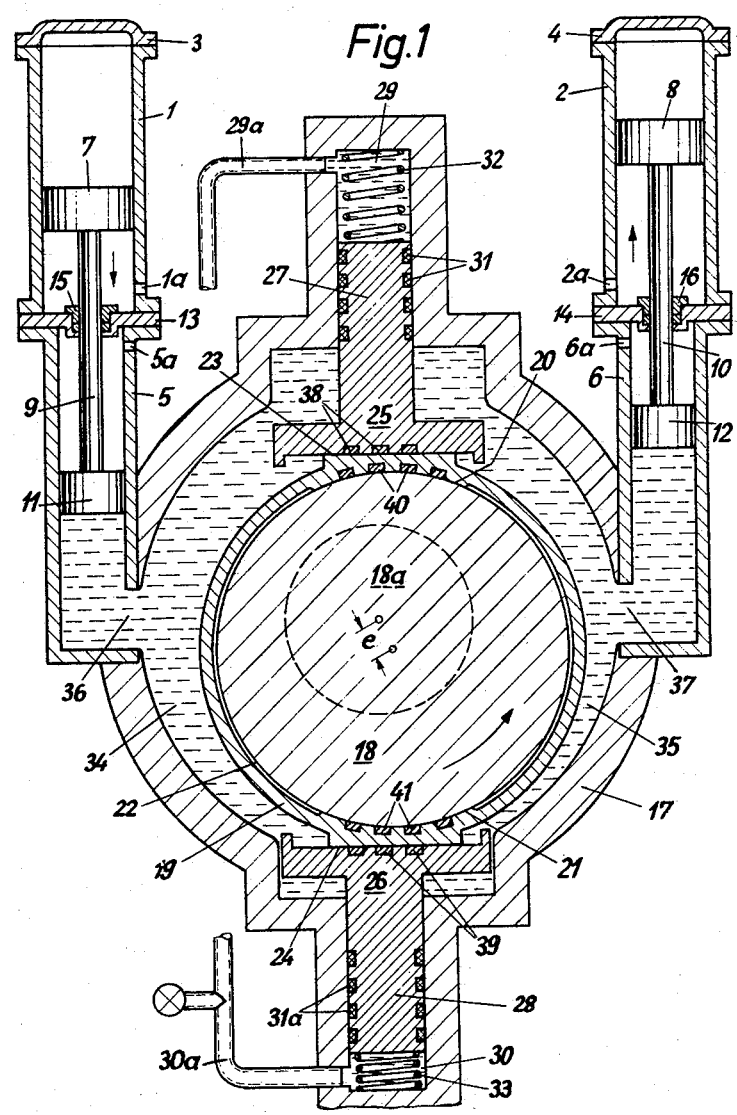
FIGURE 1 is a section of a two cylinder internal combustion engine with a hydrostatic drive.

Referring now to the drawings, and in particular to FIG. 1, the internal combustion engine has two cylinders 1 and 2, which are closed up by means of the cylinder covers 3 and 4 and which are supported by working cylinders 5 and 6. Pistons 7 and 8 slide in the cylinders 1 and 2, which pistons 7 and 8 are connected by means of piston rods 9 and 10 with the working pistons 11 and 12, which in turn slide in the working cylinders 5 and 6. Piston rods 9 and 10 are, sealed up, for example, by means of sealing members 13 and 14 and stuffing boxes 15 and 16, which are disposed between the cylinder 1 and the working cylinder 5 and between the cylinder 2 and the working cylinder 6, respectively, and which piston rods connect the piston 7 with the piston 11 and the piston 8 with the piston 12, respectively. Ventilation bores 1a, 2a, 5a and 6a, are provided in the cylinders 1 and 2 and in the working cylinders 5 and 6.

The circular disc 18 rotates in the inner chamber of the engine housing 17, which circular disc 18 is disposed eccentrically for the eccentricity $e$ relative to the engine shaft 18a. The circular disc 18 is surrounded by a ring 19, which slides with oppositely disposed faces 20 and 21 on the peripheral face 22 of the circular disc 18. The ring 19 slides with its lateral sealing faces 23 and 24 on corresponding counter faces of the slide members 25 and 26, which are disposed diagonally opposite each other in the engine housing 17, and which slide with projections 27 and 28 in corresponding recesses 29 and 30 of the engine housing 17. The sealing is brought about, thereby, by means of sealing strip rings 31 and 31a, which can be eliminated, however, if a sufficient narrow fitting is provided between the recesses 29 and 30 and projections 27 and 28. Springs 32 and 33 are arranged in the recesses 29 and 30, which springs 32 and 33 bring into engagement the slide members 25 and 26 against the corresponding sealing faces 23 and 24 of the ring 19.

The ring 19 can be connected with the slide members 25 and 26 also by interlocking means. This can be brought about, for example, in such manner that the slide members 25 and 26 are provided with a hammer head or with a dove tail groove and project into corresponding complementary faces of the lateral sealing faces 23 and 24 of the ring 19.

Upon application of such interlocking connection between the slide members 25 and 26 and the ring 19, a particular engaging pressure of the slide members 25 and 26 on the sealing faces 23 and 24 of the ring 19 is not required.

If an interlocking connection is not provided between the ring 19 and the slide members 25 and 26, the counter faces of the slide members 25 and 26 which slide on the sealing faces 23 and 24 of the ring 19 can be equipped with lateral nose projections, in order to avoid a rotation of the ring 19, upon slight lifting of the slide members 25 and 26.

The slide members 25 and 26 and the circular disc 18 with the ring 19 divide the inner chamber of the engine housing 17 into two chambers 34 and 35, the chamber 34 communicating with an inner space of the working cylinder 5 through the opening 36 and the chamber 35 with an inner space of the working cylinder 6 through the opening 37. The openings 36 and 37 are disposed opposite each other and are perpendicular to the recesses 29 and 30 in the engine housing 17. The chambers 34 and 35, as well as the inner spaces of the working cylinders 5 and 6, disposed below the pistons 11 and 12, are filled with a pressure medium, for example, with oil.

The recesses 29 and 30 are in communication with each other by means of conduits 29a and 30a. If the conduits 29a and 30a and the recesses 29 and 30 are filled with a pressure medium, for example with oil, the springs 32 and 33 can be eliminated. The springs 32 and 33 can be formed also as tension springs and serve the purpose to lift the slide members 25 and 26 from the sealing faces 23 and 24, if the pressure effect by means of the pressure fluid upon the slide members 25 and 26 is not effective. If the slide members 25 and 26 are withdrawn, the ring 19 can turn, so that no force is transmitted from the reciprocating part of the engine upon the rotary engine part. Thus, a possibility exists for taking out of operation individual cylindrical groups of the multi-cylinder engine.

The operation of the present arrangement is as follows:

During a lowering stroke of the piston 7 and of the working piston 11, pressure fluid is moved from the inner space of the working cylinder 5 into the chamber 34, whereby the circular disc 18 is moved in the direction of the arrow (shown in FIG. 1) and the shaft 18a is put to rotation. Simultaneously pressure fluid is moved by the circular disc 18 from the chamber 35 through the opening 37 into the inner space of the working cylinder 6 and, thereby, the working piston 12 and by means of the piston rod 10 also the piston 8 are moved upwardly. If the piston 8 has reached its upward dead point, and ignition takes place in the cylinder 2 of the internal combustion engine, the piston 8 and the working piston 12 are moved downwardly, and the circular disc 18 is rotated further in the direction of the arrow, until the working piston 11 and the piston 7 have reached the upward dead point position.

During the rotation of the circular disc 18, the slide members 25 and 26 slide with their projections 27 and 28 radially in the recesses 29 and 30 in the engine housing 17. The sealing faces 23 and 24 of the ring 19 slide, thereby, on the corresponding plane slide faces of the slide members 25 and 26. The plane slide faces of the slide members 25 and 26 are equipped with sealing strips 38 and 39, which are made of a material having good gliding characteristics. The sliding strips 40 and 41 are provided on the slide faces 20 and 21 of the ring 19, with which the latter slides on the peripheral face of the circular disc 18.

Figure 2:
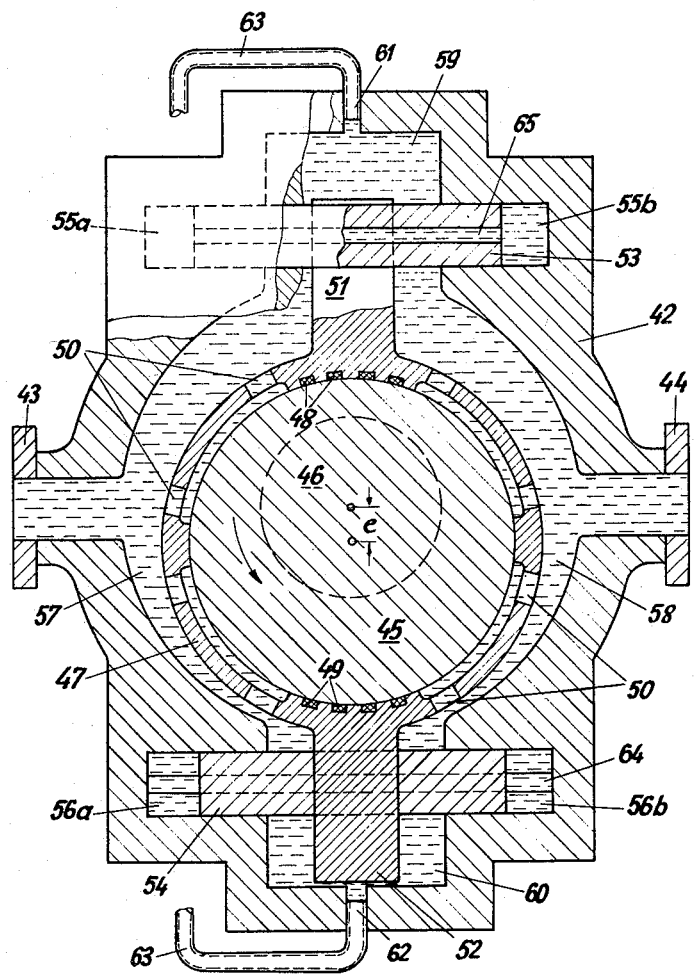
FIG. 2 is a section of a hydrostatic drive of another embodiment of the present invention.

Referring now again to the drawing, and in particular to FIG. 2, an embodiment of a hydrostatic drive is shown, which comprises an engine housing 42, equipped with flanges 43 and 44, which provide a connection with conduits, through which the working cylinders and the drive are interconnected. The eccentric circular disc 45 rotates in the inner chamber of the engine housing 42, which disc 45 is eccentrically arranged for the eccentricity $e$ relative to the engine shaft 46. The circular disc 45 is surrounded by a ring 47 which slides on the periphery of the circular disc by means of faces equipped with slide strips 48 and 49 and which ring 47 is also equipped with perforations 50 and with two lateral projections 51 and 52, which are likewise disposed opposite each other and perpendicular to the flanges 43 and 44. The projections 51 and 52 slide in corresponding recesses of the slide members 53 and 54, which slide in turn laterally from the circular disc 45 perpendicularly to the projections 51 and 52 of the ring 47 in corresponding recesses 55a, 55b, 56a and 56b of the engine housing 42. Face engagement is provided between the circular disc 45 and the ring 47, as well as between the projections 51 and 52 and the slide members 53 and 54 and the engine housing 42, so that not only a safe sealing of the two pressure chambers 57 and 58 is achieved, but the wear of the parts sliding relative to each other is reduced to a minimum.

The chambers 59 and 60 in the engine housing 42 behind the projections 51 and 52 and the slide members 53 and 54, respectively, can likewise be connected together by means of bores 61 and 62 and a conduit 63 and can be filled, for example, with oil. For refilling of oil suitable means can be provided. The recesses 55a, 55b and 56a, 56b, respectively, can be in communication with each other. The connection can then, for example, be made by a groove 64 worked in the engine housing 42 or by means of a bore 65 extending through the slide member 54.

Figure 3:
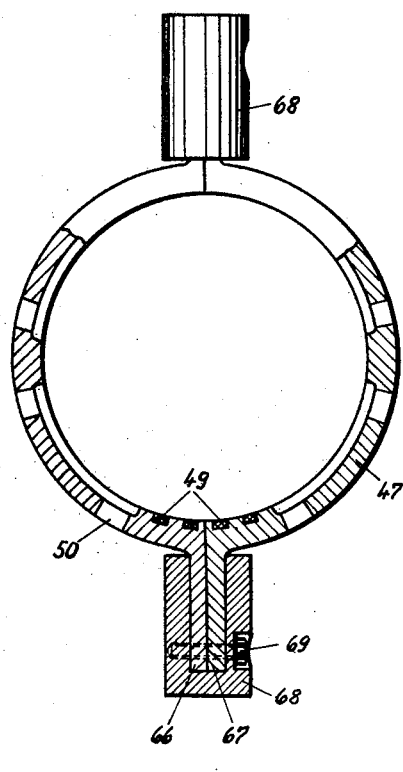
FIG. 3 shows a multiple-part ring, partly in section, surrounding the circular disc of the hydrostatic drive.

Referring once more to the drawing, and in particular to FIG. 3, the ring 47 surrounding the circular disc 45 can be formed of several parts 66 and 67, which are connected by boxes 68 and screws 69.

While I have disclosed several embodiments of the present invention, it is to be understood that these embodiments are given by example only and not in a limiting sense, the scope of the present invention being determined by the objects and the claims.

I claim:

1. A drive for conversion of a reciprocating movement into a rotary movement with a liquid as conversion means comprising an engine housing defining an inner chamber, a circular disc rotatably disposed in said inner chamber, an engine shaft carrying eccentrically said circular disc in said circular disc in said inner chamber, a ring member surrounding said circular disc and having diagonally oppositely disposed first, inner sealing faces engaging said circular disc, said sealing faces of said ring member having a curvature complementary to that of the periphery of said circular disc, slide members disposed diagonally opposite each other, said engine housing having opposite recesses receiving and being disposed complementary to said slide members for a radial movement of the latter in said recesses during rotation of said circular disc, said ring member having second, outer sealing faces.

said slide members having third, inner sealing faces engaging said second, outer sealing faces of said ring member to perform a relative gliding movement during rotation of said circular disc, said slide members having fourth sealing faces engaging the inner wall of said recesses in said engine housing and said fourth sealing faces being disposed substantially perpendicularly to said second and third sealing faces, and said inner chamber of said engine housing being adapted to communicate with working cylinders receiving reciprocating pistons to feed liquid to the respective sides of said ring member into said inner chamber to cause a rotation of said circular disc.

2. The drive, as set forth in claim 1, wherein said ring member consists of a plurality of parts.

3. The drive, as set forth in claim 1, which includes interlocking means connecting said ring with said slide members sliding in said engine housing.

4. The drive, as set forth in claim 1, wherein said sealing faces of said ring member and of said slide members have sealing strips of a material having good gliding characteristics.

References Cited in the file of this patent

FOREIGN PATENTS

| 1,241 | Germany | Dec. 19, 1877 |
| 2,105 | Great Britain | June 8, 1875 |